(12) United States Patent
Ferguson et al.

(10) Patent No.: US 10,732,629 B2
(45) Date of Patent: Aug. 4, 2020

(54) SYSTEMS AND METHODS FOR FULFILLING PEER-TO-PEER TRANSACTIONS BY AUTONOMOUS ROBOT VEHICLES

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US); Pichayut Jirapinyo, San Francisco, CA (US); Cosimo Leipold, Washington, DC (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 16/047,894

(22) Filed: Jul. 27, 2018

(65) Prior Publication Data

US 2019/0057342 A1    Feb. 21, 2019

Related U.S. Application Data

(60) Provisional application No. 62/538,538, filed on Jul. 28, 2017.

(51) Int. Cl.
  *G05D 1/00* (2006.01)
  *G06Q 10/06* (2012.01)
  (Continued)

(52) U.S. Cl.
  CPC ............ *G05D 1/0061* (2013.01); *B60P 3/007* (2013.01); *B60R 19/483* (2013.01); *B60R 21/34* (2013.01);
  (Continued)

(58) Field of Classification Search
  CPC ............ G06Q 10/0833; G06Q 10/087; G06Q 10/083; G06Q 50/28; G06Q 10/0836;
  (Continued)

(56) References Cited

U.S. PATENT DOCUMENTS

| | | | | |
|---|---|---|---|---|
| 2003/0204445 | A1* | 10/2003 | Vishik | G06Q 20/10 705/26.42 |
| 2008/0004967 | A1* | 1/2008 | Gillen | G06Q 10/08 705/24 |

(Continued)

OTHER PUBLICATIONS

Thompson, R. (2016). Creativity is critical at the last mile. Area Development Site and Facility Planning, 51(4), 16-17,20-21. Retrieved from https://dialog.proquest.com/professional/docview/1844210355?accountid=131444 (Year: 2016).*

(Continued)

*Primary Examiner* — Michael P Harrington

(57) ABSTRACT

A system for fulfilling peer-to-peer transactions by autonomous robot vehicles includes processor(s) and a memory storing instructions which, when executed by the processor(s), cause the system to: receive information on a peer-to-peer transaction between a seller and a buyer for an item, communicate instructions to an autonomous vehicle to travel to a first destination and receive the item, receive an indication that the item has been received, communicate instructions to the autonomous vehicle to travel to a second destination to deliver the item to the buyer, receive a signal indicating that buyer funds are in escrow, and receive a signal indicating that the item is accepted or rejected by the buyer. In a case where the item is accepted, the system communicates a release of the funds from the escrow to the seller. In a case the item is rejected, the system determines a handling itinerary for the item.

21 Claims, 13 Drawing Sheets

(51) Int. Cl.

| | |
|---|---|
| *G06Q 10/08* | (2012.01) |
| *G08G 1/04* | (2006.01) |
| *B60P 3/00* | (2006.01) |
| *B60R 21/34* | (2011.01) |
| *B65G 67/24* | (2006.01) |
| *G01C 21/34* | (2006.01) |
| *G05D 1/02* | (2020.01) |
| *G05D 1/12* | (2006.01) |
| *G06K 7/10* | (2006.01) |
| *G06Q 50/12* | (2012.01) |
| *G06Q 50/28* | (2012.01) |
| *G08G 1/00* | (2006.01) |
| *H04L 29/08* | (2006.01) |
| *G06N 20/00* | (2019.01) |
| *B60R 25/25* | (2013.01) |
| *G06K 9/00* | (2006.01) |
| *G06Q 50/30* | (2012.01) |
| *G06K 19/07* | (2006.01) |
| *H04W 4/024* | (2018.01) |
| *H04W 4/40* | (2018.01) |
| *G06Q 30/02* | (2012.01) |
| *G01C 21/20* | (2006.01) |
| *B60R 19/48* | (2006.01) |
| *G06F 3/0484* | (2013.01) |

(52) U.S. Cl.
CPC .............. *B60R 25/25* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06K 7/10297* (2013.01); *G06K 7/10722* (2013.01); *G06K 9/00201* (2013.01); *G06K 9/00791* (2013.01); *G06K 19/0723* (2013.01); *G06N 20/00* (2019.01); *G06Q 10/0631* (2013.01); *G06Q 10/06315* (2013.01); *G06Q 10/08* (2013.01); *G06Q 10/083* (2013.01); *G06Q 10/08355* (2013.01); *G06Q 30/0266* (2013.01); *G06Q 50/12* (2013.01); *G06Q 50/28* (2013.01); *G06Q 50/30* (2013.01); *G08G 1/04* (2013.01); *G08G 1/202* (2013.01); *H04L 67/12* (2013.01); *H04W 4/024* (2018.02); *H04W 4/40* (2018.02); *B60R 2021/346* (2013.01); *G05D 2201/0207* (2013.01); *G05D 2201/0213* (2013.01); *G06F 3/0484* (2013.01); *G08G 1/22* (2013.01)

(58) Field of Classification Search
CPC .............. G06Q 10/08; G06Q 10/0832; G06Q 10/08355; G06Q 10/0875; G06Q 10/0837; G06Q 30/0635; G06Q 50/01; G06Q 10/00; G06Q 10/02; G06Q 10/06311; G06Q 20/0655; G06Q 30/02; G06Q 30/0269; G06Q 30/06; G06Q 30/0631; G06Q 30/0643; G06Q 50/22; G06Q 50/30; G06Q 99/00
See application file for complete search history.

(56) References Cited

U.S. PATENT DOCUMENTS

| | | |
|---|---|---|
| 2010/0084426 A1 | 4/2010 | Devers et al. |
| 2010/0088175 A1* | 4/2010 | Lundquist .......... G06Q 30/0234 |
| | | 705/14.34 |
| 2014/0081445 A1 | 3/2014 | Villamar |
| 2014/0136414 A1 | 5/2014 | Abhyanker |
| 2015/0006005 A1 | 1/2015 | Yu et al. |
| 2016/0239798 A1 | 8/2016 | Borley et al. |
| 2017/0132565 A1* | 5/2017 | Beadles ............. G06K 7/10297 |
| 2017/0174343 A1 | 6/2017 | Erickson et al. |
| 2017/0286892 A1* | 10/2017 | Studnicka ............ G06Q 10/083 |
| 2017/0313421 A1* | 11/2017 | Gil .......................... H04W 4/70 |
| 2018/0033235 A1* | 2/2018 | Dotterweich ....... G07C 9/00896 |

OTHER PUBLICATIONS

Notification of Transmittal of the International Search Report and the Written Opinion of the International Search Authority, or the Declaration issued in corresponding application No. PCT/US2018/044170 dated Nov. 15, 2018, 14 pages.

Notification of Transmittal of the International Search Report and the Written Opinion of the International Search Authority, or the Declaration issued in corresponding application No. PCT/US2018/044361 dated Oct. 10, 2018, 12 pages.

* cited by examiner

SYSTEMS AND METHODS FOR FULFILLING PEER-TO-PEER TRANSACTIONS BY AUTONOMOUS ROBOT VEHICLES

CROSS-REFERENCE TO RELATED APPLICATIONS

The present application claims priority to U.S. Provisional Application No. 62/538,538, filed on Jul. 28, 2017, which is hereby incorporated by reference in its entirety.

TECHNICAL FIELD

The present application relates to autonomous vehicles, and in particular, to autonomous vehicles systems and methods for fulfilling peer-to-peer transactions by autonomous robot vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications. With advancements in autonomous robot technology, new uses for autonomous robots are becoming possible.

Peer-to-peer purchases tend to happen in-person due to the nature of this type of commerce. For example, one factor is that the buyer would want to spend some time inspecting the products, leading to a high rate of not accepting the products in this type of sales. With the inspection time and high rate of return, it is not efficient to utilize a courier service to deliver goods for peer-to-peer purchases.

Most of peer-to-peer commerce occurs with the use of electronic channels such as Craigslist® or Facebook® Marketplace as a way to facilitate product listings. Even so, most times, the buyer and seller will still meet in person to inspect the product(s) and exchange cash. Accordingly, there is interest in developing technologies for improving peer-to-peer marketplace transactions.

SUMMARY

This disclosure relates to a fully-autonomous and/or semi-autonomous robot fleet and, in particular, to a fleet of robot vehicles for transporting or retrieving deliveries in either unstructured outdoor environment or closed environments. In one aspect, the present disclosure provides systems for peer-to-peer autonomous robot vehicle delivery. In various embodiments, the autonomous vehicles can be land vehicles, water vehicles, and/or aerial vehicles, among others.

In accordance with aspects of the present disclosure, the system includes one or more processors and at least one memory storing instructions which, when executed by the one or more processors, cause the system to: receive information from a peer-to-peer marketplace on a peer-to-peer transaction between a seller and a buyer for a seller item, communicate instructions to an autonomous robot vehicle to travel to a first destination and receive the seller item, receive an indication from the autonomous robot vehicle that the seller item has been received, communicate instructions to the autonomous robot vehicle to travel to a second destination to deliver the seller item to the buyer, receive a signal indicating that buyer funds are in escrow, receive from the autonomous vehicle a signal indicating one of: the seller item is accepted by the buyer or the seller item is rejected by the buyer, in case the seller item is accepted by the buyer, communicate a release of the buyer funds from the escrow to the seller; and in case the seller item is rejected by the buyer, determine a handling itinerary for the seller item.

In various embodiments, the first destination is a warehouse storing the seller item.

In various embodiments, the instructions, when executed by the one or more processors, cause the system to receive a video from the autonomous robot vehicle that records an acceptance of the seller item by the buyer. In various embodiments, the instructions, when executed by the one or more processors, cause the system to store the video in the at least one memory.

In various embodiments, in the case the seller item is rejected by the buyer, the handling itinerary includes instructions to the autonomous vehicle to travel to the first destination to return the seller item to the seller.

In various embodiments, the system is configured for communication with a device of the buyer.

In various embodiments, the autonomous robot vehicle includes at least one securable module configured to unlock based on biometric data corresponding to the buyer and based on the signal indicating that buyer funds are in escrow.

In various embodiments, the autonomous robot vehicle is configured to determine, in the case the seller item is rejected by the buyer, whether the seller item has been placed back in at least one securable module of the autonomous vehicle.

In various embodiments, the autonomous robot vehicle is configured to determine a first weight of the seller item, and in the case the seller item is rejected by the buyer, determine a second weight of an item placed back in the at least one securable module, and compare the first weight and the second weight to determine whether the item placed back in the at least one securable module is the seller item.

In various embodiments, the autonomous robot vehicle is configured to capture a first image of the seller item, and in the case the seller item is rejected by the buyer, capture a second image of an item placed back in the at least one securable module, and compare the first image and the second image to determine whether the item placed back in the at least one securable module is the seller item.

In various embodiments, the autonomous robot vehicle is configured to, in the case the seller item is rejected by the buyer, capture a video of an item placed back in the at least one securable module, communicate the video for viewing by the seller, and receive a seller confirmation that the item placed back in the at least one securable module is the seller item.

In accordance with aspects of the present disclosure, a method for fulfilling peer-to-peer transactions by autonomous robot vehicle includes receiving information from a peer-to-peer marketplace on a peer-to-peer transaction between a seller and a buyer for a seller item, receiving a signal indicating that buyer funds are in escrow, communicating instructions to an autonomous robot vehicle to travel to a first destination and receive the seller item, receiving an indication from the autonomous robot vehicle that the seller item has been received, communicating instructions to the autonomous robot vehicle to travel to a second destination and deliver the seller item to the buyer, receiving from the autonomous vehicle a signal indicating one of: the seller item is accepted by the buyer or the seller item is rejected by the buyer, in case the seller item is accepted by the buyer, communicating a release of the buyer funds from the escrow to the seller, and in case the seller item is rejected by the buyer, determining a handling itinerary for the seller item.

In various embodiments, the first destination is a warehouse storing the seller item.

In various embodiments, the method includes receiving a video from the autonomous robot vehicle that records an acceptance of the seller item by the buyer. In various embodiments, the method includes storing the video.

In various embodiments, in the case the seller item is rejected by the buyer, the handling itinerary includes instructions to the autonomous vehicle to travel to the first destination to return the seller item to the seller.

In various embodiments, the method includes unlocking at least one securable module of the autonomous robot vehicle based on biometric data corresponding to the buyer and based on the signal indicating that buyer funds are in escrow.

In various embodiments, the method includes determining, in the case the seller item is rejected by the buyer, whether the seller item has been placed back in at least one securable module of the autonomous vehicle.

In various embodiments, the method includes determining a first weight of the seller item, and in the case the seller item is rejected by the buyer, determining a second weight of an item placed back in the at least one securable module, and comparing the first weight and the second weight to determine whether the item placed back in the at least one securable module is the seller item.

In various embodiments, the method includes capturing a first image of the seller item, and in the case the seller item is rejected by the buyer, capturing a second image of an item placed back in the at least one securable module, and comparing the first image and the second image to determine whether the item placed back in the at least one securable module is the seller item.

In various embodiments, the method includes, in the case the seller item is rejected by the buyer, capturing a video of an item placed back in the at least one securable module, communicating the video for viewing by the seller, and receiving a seller confirmation that the item placed back in the at least one securable module is the seller item.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
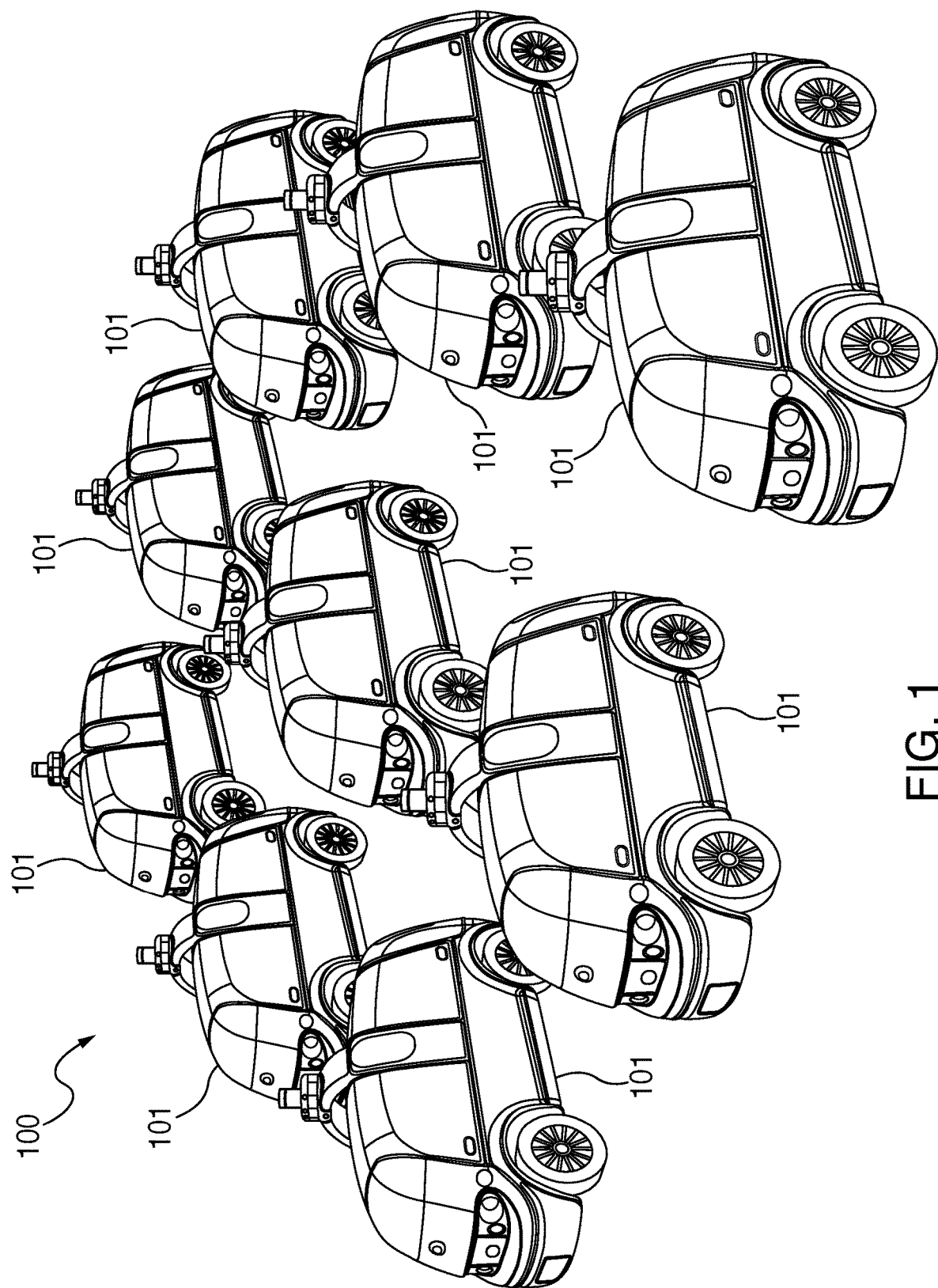
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments. In one aspect, the present disclosure provides systems and autonomous vehicles for peer-to-peer autonomous robot vehicle delivery.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. The term "sub-compartment" is generally used to indicate a subdivision or portion of a compartment. When used in the context of a compartment or sub-compartment, the term "module" may be used to indicate one or more compartments or sub-compartments.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous. In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
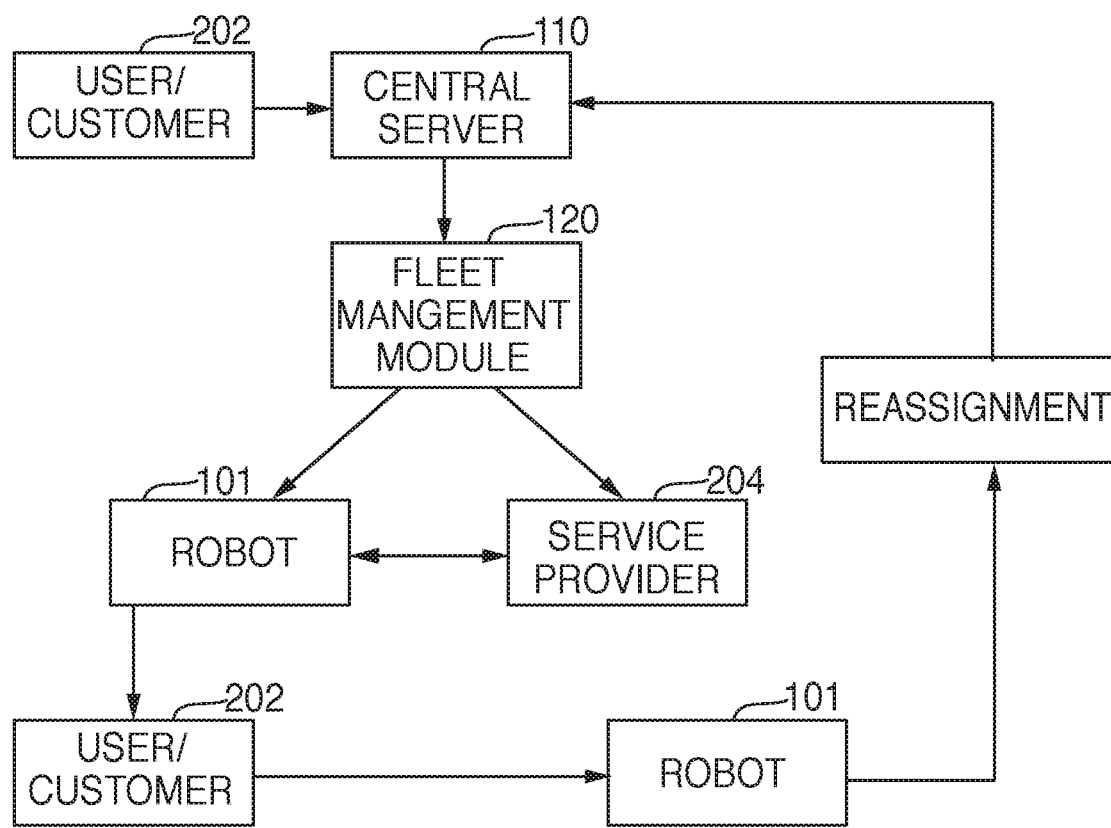
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
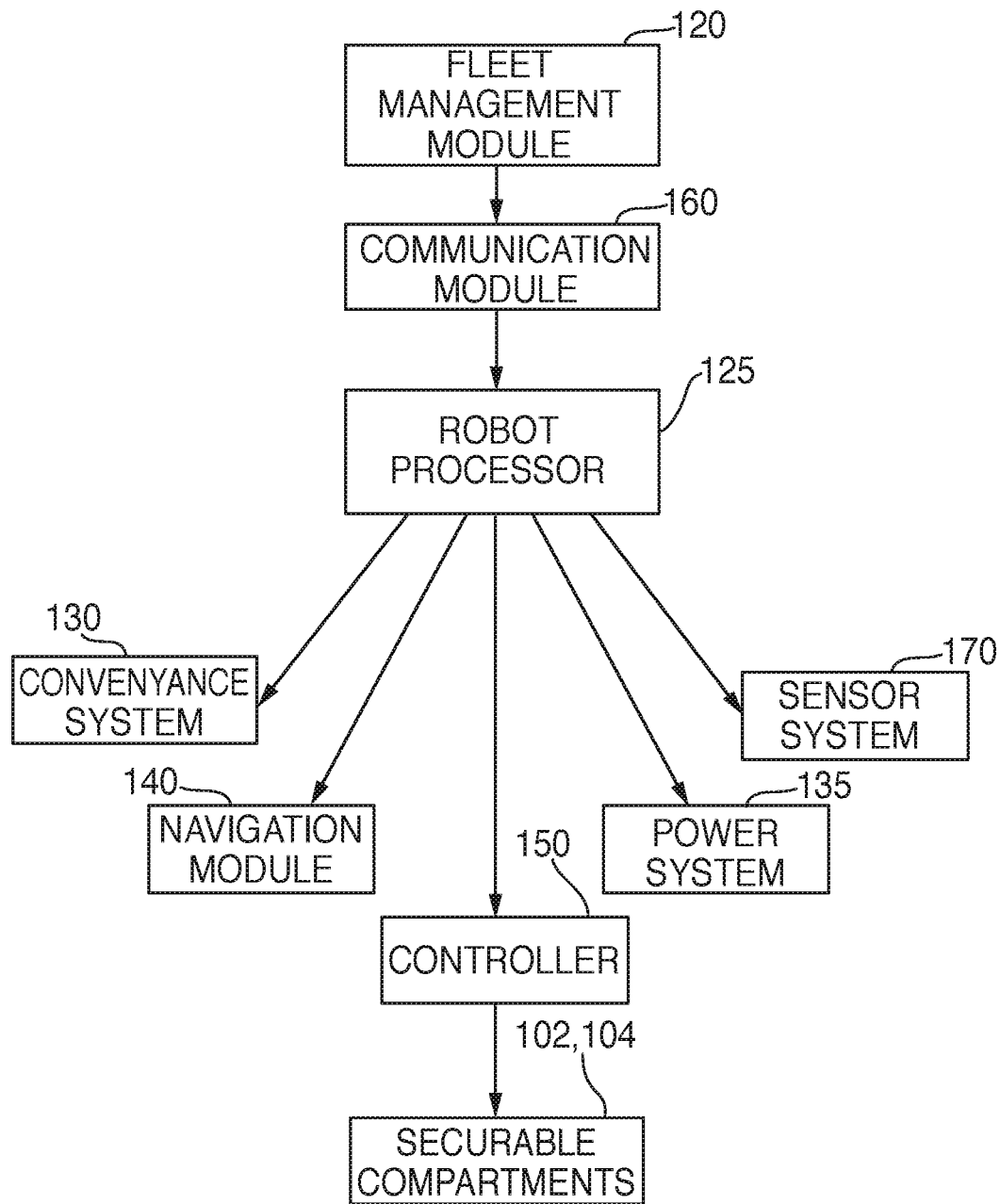
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, a buyer, a seller, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

In accordance with aspects of the present disclosure, various robots in the fleet are each configured to enable secure peer-to-peer transactions without identity disclosure. An embodiment of the present disclosure provides a peer-to-peer fulfillment system to execute peer-to-peer transactions and payments. Referring to FIG. 11, in various embodiments, the peer-to-peer fulfillment system can be part of central server 110 or can be a separate server or system.

Figure 13:
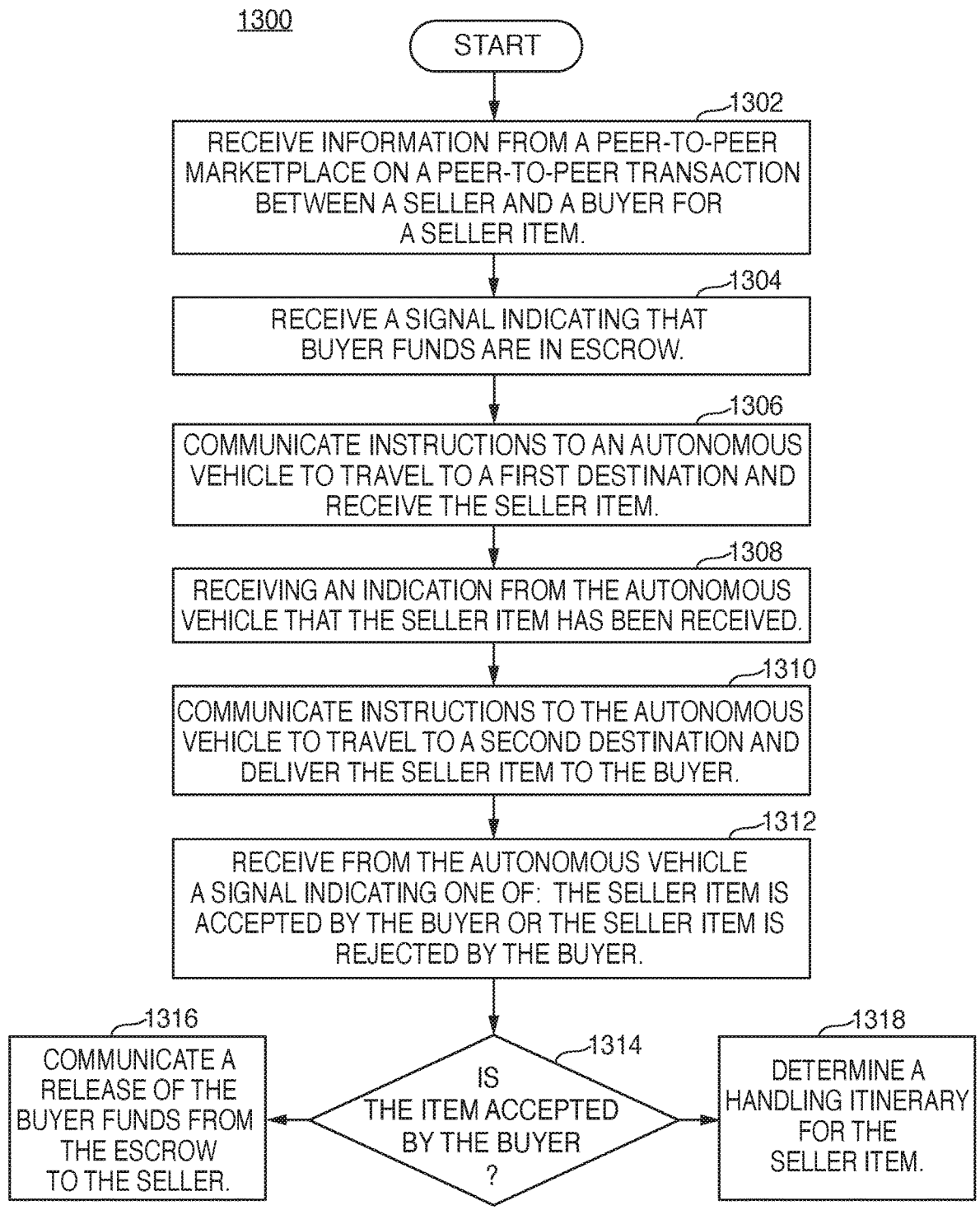
FIG. 13 is a diagram illustrative of a method for peer-to-peer autonomous robot vehicle delivery.
Figure 14:
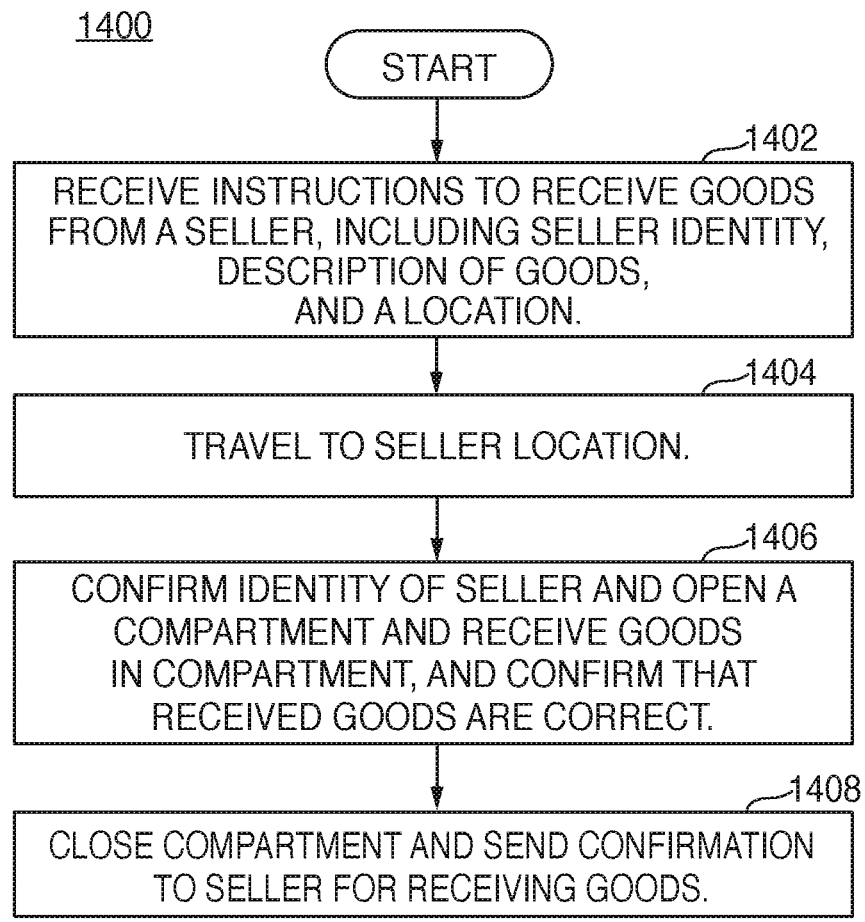
FIG. 14 is a diagram illustrative is a diagram of a flow chart of operations relating to receiving items of a seller.
Figure 15:
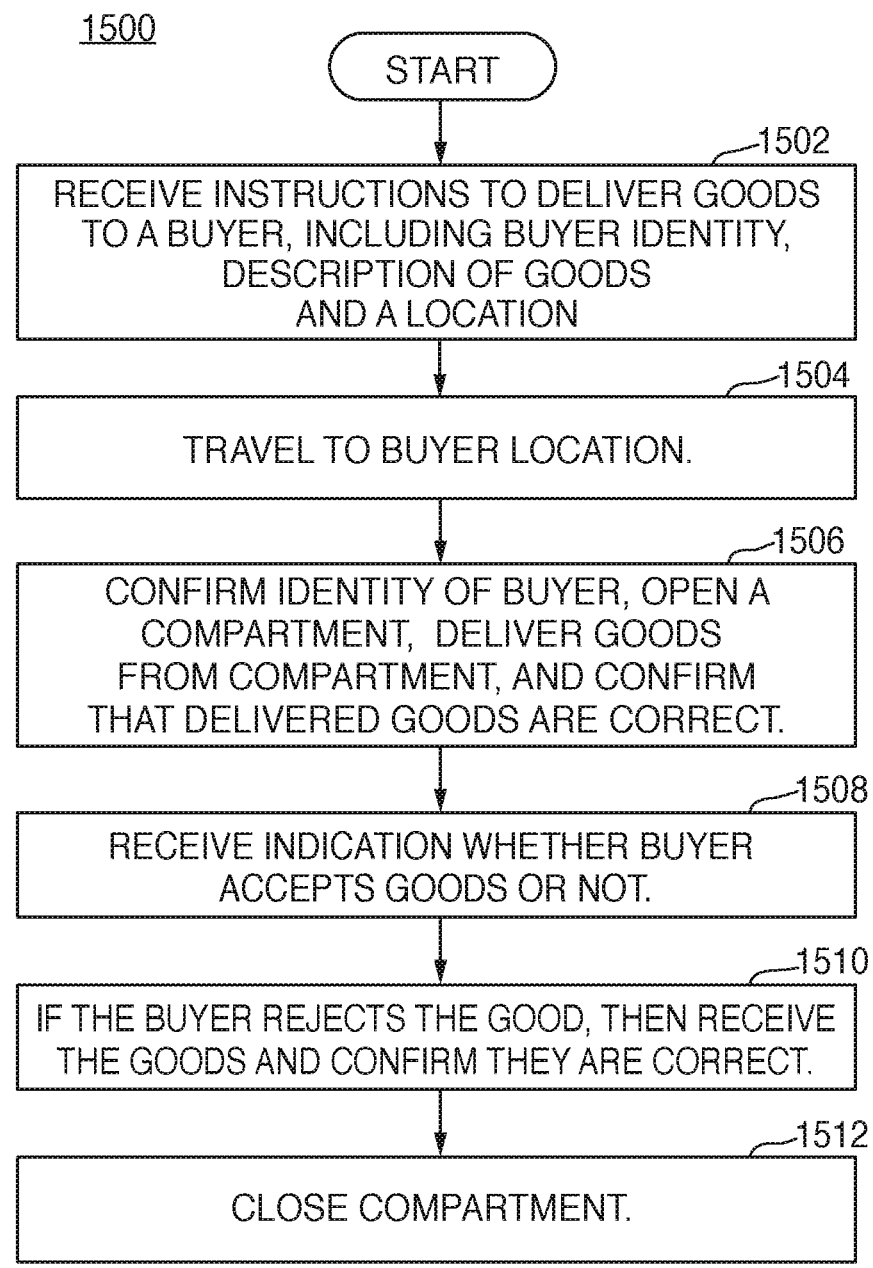
FIG. 15 is a diagram illustrative of a method for peer-to-peer autonomous robot vehicle delivery.
Figure 16:
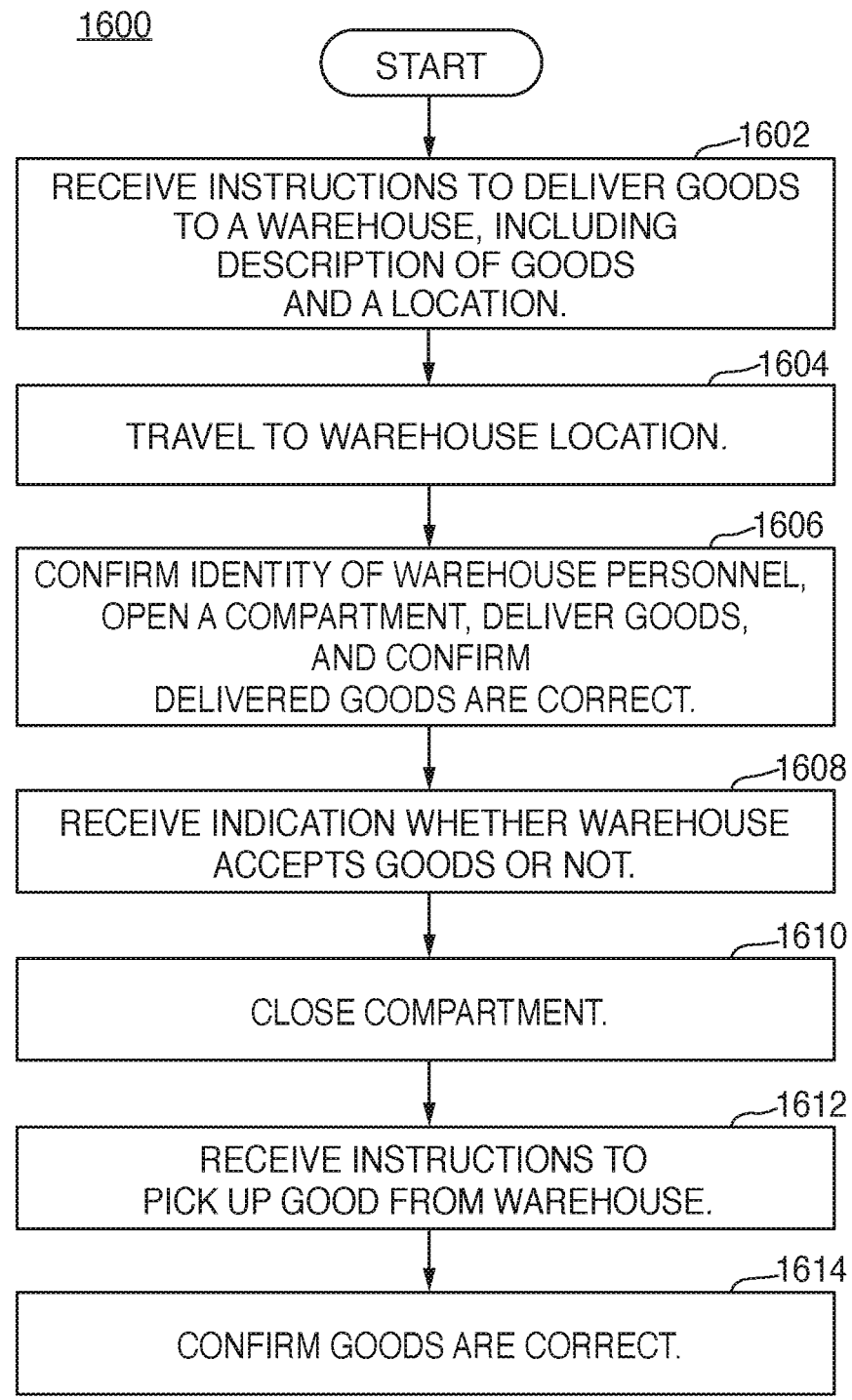
FIG. 16 is a diagram illustrative of a method for peer-to-peer autonomous robot vehicle delivery.

FIG. 13 is a diagram illustrative of a high level method 1300 for fulfillment of peer-to-peer transactions using autonomous robot vehicles. FIGS. 14-16 illustrate various operations of the high level method in more detail. The method 1300 includes various operations in an ordered sequence. However, those skilled in the art will appreciate that one or more operations of the method 1300 may be performed in a different order, repeated, and/or omitted without departing from the scope of the present disclosure.

In accordance with aspects of the present disclosure, the method 1300 operates with a peer-to-peer marketplace that enables product listings and peer-to-peer communications, such as Craigslist®, but does not include operations of the peer-to-peer marketplace. Rather, the method 1300 operates in conjunction with a peer-to-peer marketplace to fulfill peer-to-peer transactions. In an embodiment, the present disclosure provides a peer-to-peer fulfillment system to enable transactions between buyers and sellers without identity disclosure. The peer-to-peer fulfillment system may dispatch autonomous vehicles based on incoming transactions. In another embodiment, the peer-to-peer fulfillment system may allow buyers or sellers to request pickups and/or drop-offs, either as soon as possible or at a scheduled time in the future.

The method 1300 may begin with the peer-to-peer fulfillment system of the present disclosure receiving information from a peer-to-peer marketplace on a peer-to-peer transaction between a seller and a buyer for a seller item, at step 1302. The peer-to-peer fulfillment system receives a signal indicating that a peer-to-peer marketplace transaction has occurred and buyer funds are in escrow, at step 1304. For example, a buyer may transfer funds into escrow by using an application on a mobile device. The mobile device communicates with the peer-to-peer fulfillment system by sending it a signal indicating that funds are in escrow. The system may include an escrow system. The term "escrow" is used herein to refer to the custody of payer funds by an authorized third party and a condition for the release of the payer funds to a payee, where the third party is neither the payer nor the payee. In various embodiments, the condition is, for example, a buyer's acceptance of a seller item. In an embodiment, the peer-to-peer fulfillment system receives electronic payments from buyers and transfers the right amount of funds to the right sellers. The peer-to-peer fulfillment system can withhold a predetermined amount or percentage of the funds transferred as a commission. The peer-to-peer fulfillment system includes at least a buyer's payment processing system and a system that distributes payment to a seller within a certain period of time of completion of the transaction. In another embodiment, the peer-to-peer fulfillment system may include an escrow system that processes charges to a potential buyer at some point before the buyer is allowed to access the goods, and places the money in escrow. The money can be kept in escrow until the buyer accepts or rejects the item. For example, if the item is rejected, the payment is refunded to the buyer. If the item is accepted, the payment is put into the seller's account.

It is contemplated that the robot vehicle may be dispatched prior to the potential buyer's money being in escrow, so long as the money is in escrow prior to the autonomous robot vehicle opening its secured compartment to the buyer. In another embodiment, the buyer may use other forms of payment, such as a credit card. For example, the system could preauthorize the credit card with the full purchase price of the seller item, and cancel the transaction if the item is rejected by the buyer. In various embodiments, the signal indicating that the buyer funds are in escrow can be received any time before the autonomous robot vehicle opens its secured compartment to the buyer, such as immediately before the autonomous robot vehicle opens its secured compartment to the buyer.

At step 1306, the system will communicate instructions to an autonomous robot vehicle 101 to travel to a first destination and receive the seller item. This first destination, for example, could be a residential address, a commercial address, or a GPS location. Next, the seller item is received in at least one securable compartment 102, 104 of an autonomous robot vehicle 101. They could be received, for example, from a seller, or from a warehouse, which will be explained in more detail in connection with FIGS. 14 and 16. After the item is received by the autonomous robot vehicle 101, the peer-to-peer fulfillment system receives an indication from the autonomous robot vehicle 101, that the seller item has been received, at step 1308.

Next, at step 1310, the system communicates instructions to the autonomous robot vehicle 101 to travel to a second destination and to deliver the seller item to the buyer. This destination, for example, could be a residential address, a commercial address, or a GPS location, wherever the buyer is located. For example, the buyer could be located at the beach or a camp site. The autonomous robot vehicle 101 determines a travel route that includes the destination. The route may include multiple destinations. The navigation system of the autonomous vehicle may determine a route that achieves multiple deliveries in a minimum amount of time or gas. The conveyance system of the autonomous robot vehicle 101 is controlled to travel the route to reach the destination. Finally, the autonomous robot vehicle 101 delivers the seller item, at the destination, for the buyer to inspect and either accept or reject, at step 1312, 1314. If the buyer accepts the seller item, then the system communicates a release of the buyer's funds from the escrow to the seller, at step 1316. If the buyer rejects the seller item, the system determines a handling itinerary for the seller item, at step 1318.

FIG. 14 is a diagram of a flow chart 1400 of operations relating to receiving items of a seller. Initially at step 1402 the autonomous robot vehicle 101 receives instructions to receive items from a seller. The instructions include, for example, seller identity, description of the item, and a location. The instruction to the autonomous robot vehicle 101 can be provided by the peer-to-peer fulfillment system based on, for example, information provided by a peer-to-peer marketplace.

The autonomous robot vehicle 101, at step 1404 travels to the seller's location. In an embodiment, the peer-to-peer fulfillment system may notify the seller and/or a buyer when the vehicle is on the way. In an embodiment, the robot vehicle may utilize the navigation system to find the most efficient route to pick up/receive the item from the seller while fulfilling other peer-to-peer transactions. For example, an efficient route may be the one with the lowest fuel usage, or the shortest time. Other route determination factors and techniques are contemplated to be within the scope of the present disclosure.

In accordance with aspects of the present disclosure, the peer-to-peer fulfillment system enables trust in two-way exchanges of the item for money without in-person interactions. For example, the peer-to-peer fulfillment system may verify the identity of the seller, without letting the buyer know the identity. In step 1406, the autonomous robot vehicle 101 confirms the identity of seller and opens a compartment 102, 104. In an embodiment the peer-to-peer fulfillment system ensures secure access to autonomous robot vehicles 101 and the item inside only by intended persons without buyers and sellers having to disclose identities to one another. In an embodiment, the peer-to-peer fulfillment system stores the seller's locations as well as other data points that would help identify a seller, which for example, may include names, birthdays, PIN numbers, phone numbers, user accounts, and/or biometric information, such as facial recognition or fingerprints. The peer-to-peer fulfillment system does not expose this information to the buyer during transactions, but may use any combination of these to identify the seller and allows only verified sellers to access vehicles' compartments. In one embodiment, the seller may use a smartphone app with their account logged in to access the robot vehicle 101. In another embodiment, the seller receives a PIN code via a text message from the peer-to-peer fulfillment system that can be used to open the robot vehicle 101. In another embodiment, the peer-to-peer fulfillment system may use facial recognition or other biometric information to identify the seller before letting them access the inside of the robot vehicles 101. Such examples are merely illustrative, and other verification or identification mechanisms are contemplated to be within the scope of the present disclosure.

After confirmation of the seller's identity, the robot vehicle receives the item in a compartment 102, 104, and confirms that received item is correct. In an embodiment, the robot vehicle 101 may confirm that received item is correct by using, for example, the weight, a photo, or an RF ID tag, among other things. In various embodiments, the robot vehicle can receive item in a sub-compartment, and the descriptions relating to a compartment apply to a sub-compartment as well. In various embodiments, the robot vehicle can determine which compartment or sub-compartment to assign to a particular buyer based on the seller's description of the item, which may include dimension information and weight information.

In step 1408, the autonomous robot vehicle 101 closes the compartment 102, 104 and sends confirmation to the seller for receiving the item. For example, the autonomous robot vehicle 101 can record and send the photo and weight measurement of the received item to the seller as confirmation for receiving the item. In various embodiments, the autonomous robot vehicle can send this information to the peer-to-peer fulfillment system, which can send the confirmation to the seller based on this information.

In one embodiment, the robot vehicle 101 receives the item from the seller when a peer-to-peer marketplace transaction has occurred, such as, for example, after the peer-to-peer marketplace system indicates that a buyer would like to inspect the item or after the peer-to-peer fulfillment system receives escrow of buyer funds. In another embodiment, the robot vehicle 101 can receive the item from a seller even when a peer-to-peer marketplace transaction has not yet occurred. For example, a seller can elect to store the item with a warehouse of the peer-to-peer fulfillment system before a transaction actually occurs, and the autonomous robot vehicle 101 can receive the seller item and delivery them to a warehouse for storage. The peer-to-peer fulfillment system would then, at a later point, upon receiving confirmation of a peer-to-peer marketplace transaction for that good, instruct the robot vehicle 101 to travel to the warehouse to pick up the item and the deliver them to a buyer. FIG. 16 illustrates such operations in more detail.

In another embodiment, the peer-to-peer fulfillment system may be an asynchronous peer-to-peer fulfillment system. The seller and buyer would not have to be available at the same time. The seller can put the item into a compartment 102 in the autonomous robot vehicle 101 and leave the item in the compartment 102 for a period of time (e.g., days, weeks, or months). Any potential buyers can purchase from the autonomous robot vehicle 101 at this later point in time.

FIG. 15 is a diagram of a flow chart 1500 of operations relating to delivering the item to a buyer. Initially, at step 1502, the robot vehicle 101 receives instructions to deliver the item to a buyer. The instructions may include the buyer's identity, description of the item, and a location. In an embodiment, this information can be submitted to the peer-to-peer fulfillment system by way of a mobile device application or by a peer-to-peer marketplace system. In various embodiments, the instruction to deliver the item to a buyer can be issued by the peer-to-peer fulfillment system after the item is confirmed to be within the autonomous robot vehicle.

At step 1504 the robot vehicle 101 uses the navigation system and the conveyance system to travel to the buyer's location. In an embodiment, the peer-to-peer fulfillment system may notify the buyer and when the robot vehicle 101 is on the way. In an embodiment, the robot vehicle may utilize the navigation system to find the most efficient route to deliver the item to the buyer while fulfilling other peer-to-peer transactions. For example, an efficient route may be the one with the lowest fuel usage, or the shortest travel time. Other route determination factors and techniques are contemplated to be within the scope of the present disclosure.

Next, at step 1506 the peer-to-peer fulfillment system confirms the identity of buyer and opens a compartment 102, 104, thereby delivering the item to the buyer. In an embodiment, the peer-to-peer fulfillment system stores the buyer's locations as well as other data points that would help identify the buyer, which for example, may include names, birthdays, PIN numbers, phone numbers, user accounts, and biometric information such as facial recognition or fingerprints. The peer-to-peer fulfillment system does not expose this information to the seller during transactions, but may use any combination of these to identify the buyer and allows only a verified buyer to access the vehicles' compartments 102, 104. In one embodiment, the buyer may use a smartphone app with their account logged in to access the vehicle. In another embodiment, the buyer receives a PIN code via a text message from the peer-to-peer fulfillment system that can be used to open the robot vehicle 101. In another embodiment, the peer-to-peer fulfillment system may use facial recognition or other biometric information to identify the buyer before letting them access content inside the robot vehicle's 101 compartments 102, 104. Such examples are merely illustrative, and other verification or identification mechanisms are contemplated to be within the scope of the present disclosure.

In various embodiments, the robot vehicle 101 can confirm that the item delivered to the verified buyer is the correct item. In various embodiments, the robot vehicle 101 can perform the confirmation based on information such as the weight of the item, or an image of the item.

At step 1508, the peer-to-peer fulfillment system receives indication whether buyer accepts the item or not. The indication, for example, may be the closing of the empty compartment, the confirmation on a mobile device application, or confirmation on an interface on the robot vehicle 101. In an embodiment, if the item is accepted by the buyer, the peer-to-peer fulfillment system transfers funds to seller and confirms fulfillment to buyer and seller.

At step 1510, if the buyer rejects the item, then the robot vehicle 101 receives the item in a compartment or sub-compartment and confirms they are the correct item. If the item is rejected by the buyer, the peer-to-peer fulfillment system notifies the seller. If the item returned to the compartment or sub-compartment are not correct, the robot vehicle 101 can issue an alert or can send a signal to the peer-to-peer fulfillment system, which can send an alert. In an embodiment, the alert informs the seller. In an embodiment, the peer-to-peer fulfillment system withholds buyer escrow, if the rejected item is placed back in the robot vehicle are not correct. The robot vehicle 101 can detect if the goods returned to the compartment 102, 104 are correct based on, for example, weight, size, and/or image recognition, as described in more detail below.

At step 1512, the robot vehicle closes the compartment. If the item is accepted, the peer-to-peer fulfillment system can send notification to the seller that the item was accepted. If the item is rejected, the peer-to-peer fulfillment system can send notification to the seller that the item was rejected. In various embodiments, if the item is rejected, the peer-to-peer fulfillment system can instruct the robot vehicle to travel to the seller location so that the item can be returned to the seller. In various embodiments, if the item is rejected, the peer-to-peer fulfillment system can instruct the robot vehicle to travel to a warehouse location so that the item can be stored in the warehouse. In various embodiments, if the item is rejected, the peer-to-peer fulfillment system can instruct the robot vehicle to store the item while fulfilling other peer-to-peer transactions. If a new buyer appears when the item is still stored in the robot vehicle 101, the peer-to-peer fulfillment system can instruct the robot vehicle to travel to the location of the new buyer.

In another embodiment in accordance with the present disclosure, the peer-to-peer fulfillment system allows a buyer to easily return the rejected item and receive a refund. In an embodiment, the autonomous robotic vehicle 101 may include both software and hardware system to monitor the item being handled via the peer-to-peer fulfillment system. The peer-to-peer fulfillment system monitors products being returned to ensure that the right products are placed inside robot vehicles 101. The peer-to-peer fulfillment system utilizes a number of sensors to detect the content inside an autonomous robot vehicle 101. When a potential buyer takes out content from the robot vehicle 101, decides to not accept the content, and returns it to the robot vehicle 101, the peer-to-peer fulfillment system can use these sensors to verify that the returned content is the same as what the buyer removed for inspection. In various embodiments, the peer-to-peer fulfillment system may use a weight sensor and/or a camera inside the compartment to determine the properties of the content when the seller first put in and again when the potential buyer returns the content into the compartment 102, 104, and to verify that they are the same.

In various embodiments, the autonomous robot vehicle can determine or access the weight of the seller item before it is delivered to the buyer. In the case the seller item is rejected by the buyer and an item is placed back into the vehicle, the autonomous robot vehicle can determine the weight of the item placed back into the vehicle, and compare the weight of the seller item to the weight of the item placed back into the vehicle to determine whether the item placed back into the vehicle is the seller item. In such an embodiment, the autonomous robot vehicle can include a weight sensor in one or more securable compartments.

In various embodiments, the autonomous robot vehicle can capture or access an image of the seller item before it is delivered to the buyer. In the case the seller item is rejected by the buyer and an item is placed back into the vehicle, the autonomous robot vehicle can capture an image of the item placed back into the vehicle, and compare the image of the seller item with the image of the item placed back into the vehicle to determine whether the item placed back in the vehicle is the seller item. In such an embodiment, the autonomous robot vehicle can include an imaging device, such as a camera, in one or more securable compartments. In various embodiments, the image comparison can be performed using various techniques and technologies, such as machine learning, computer vision, neural networks, and/or object recognition techniques.

In various embodiments, the autonomous robot vehicle can have a seller confirm that item placed back into the vehicle is the seller item. The robot vehicle can capture a video of an item placed back into the vehicle and communicate the video for viewing by the seller. In various embodiments, the video can be streamed live or can be delayed and not live. In various embodiments, the video can be communicated directly to a seller device. In various embodiments, the video can be communicated to the peer-to-peer fulfillment system, which then redirects or forwards the video to the seller device. After reviewing the video, the seller can indicate whether the item is the correct seller item. If the item is correct, the seller can indicate so in the seller device, and the autonomous robot vehicle can receive the seller confirmation that the item placed back in the vehicle is the seller item.

FIG. 16 is a diagram of a flow chart 1600 of operations relating to delivering the item to a warehouse and picking up the item from a warehouse. In accordance with aspects of the present disclosure, the system ensures peer-to-peer purchases can happen without both sellers and buyers having to be available at the same time. The system provides an integrated system between software and warehouse to store products temporarily until they can be delivered to a buyer or returned to a seller. This allows for peer-to-peer transactions without buyers and sellers being available at the same time. Initially at step 1602, the robot vehicle 101 receives instructions to deliver the item to a warehouse. The instructions may include warehouse location and a description of the item.

At step 1604, the robot vehicle 101 uses the navigation system and the conveyance system to travel to the warehouse. In an embodiment, the peer-to-peer fulfillment system may notify the warehouse when the robot vehicle 101 is on the way. In an embodiment, the robot vehicle 101 may utilize the navigation system to find the most efficient route to deliver the item to the warehouse while fulfilling other peer-to-peer transactions. For example, an efficient route may be the one with the lowest fuel usage, or the shortest time. Other route determination factors and techniques are contemplated to be within the scope of the present disclosure.

At step 1606, the peer-to-peer fulfillment system confirms the identity of the warehouse personnel and opens a compartment 102, 104, delivers the item, and the warehouse confirms that the item is correct. In an embodiment, the peer-to-peer fulfillment system stores the warehouse's locations as well as other data points that would help identify the warehouse personnel, which for example, may include names, birthdays, PIN numbers, phone numbers, user accounts, and biometric information, such as facial recognition or fingerprints. The peer-to-peer fulfillment system may use any combination of these to identify the warehouse personnel and allows only verified warehouse personnel to access the robot vehicles' 101 compartments 102, 104. In one embodiment, the warehouse personnel may use a smartphone app with their account logged in to access the robot vehicle 101. In another embodiment, the warehouse personnel receives a PIN code via a text message from the peer-to-peer fulfillment system that can be used to open the robot vehicle 101. In another embodiment, the peer-to-peer fulfillment system may use facial recognition or other biometric information to identify the warehouse personnel before permitting access to the robot vehicle's 101 compartments 102, 104. In an embodiment the good may be unloaded either autonomously or by humans at the warehouse. In another embodiment, the warehouse may use an automated method of unloading using a robot or other mechanical machinery.

At step 1608, the peer-to-peer fulfillment system receives an indication of whether the warehouse accepts the item or not. In an embodiment, the warehouse personnel may inspect the item for acceptance or rejection. In the case where the item is accepted, the warehouse indicates to the peer-to-peer fulfillment system that the item is accepted. Then at step 1610, the compartment is closed.

In an embodiment, a buyer may buy the item that are stored at the warehouse. At step 1612, the robot vehicle 101 receives an instruction to pick up the item from a warehouse. The particular robot vehicle 101 picking up the item from the warehouse can be the same robot vehicle which dropped off the item at the warehouse or can be a different robot vehicle. In this case, the peer-to-peer fulfillment system instructs the robot vehicle 101 to travel to the warehouse and pick up the item. The instructions may include description of the item and a location. In various embodiments, the peer-to-peer fulfillment system may confirm the identity of the warehouse personnel, and the robot vehicle 101 would receive the item into its compartment 102, 104. It is contemplated that the item may be loaded into the robot vehicle 101 at the warehouse by warehouse personnel or by machinery or automated robots. At step 1614, the robot vehicle 101 then confirms the item is correct. The peer-to-peer fulfillment system may then send an indication to the buyer and the seller that the item is loaded and in transit to the buyer.

In accordance with aspects of the present disclosure, a peer-to-peer marketplace system may be provided, including a user interface, such as a website and/or smartphone app, that allows users to post items and prices, and also keeps user's information such as locations and availability in private. Accordingly, it is contemplated that a peer-to-peer marketplace system may be provided under the present disclosure. The marketplace interface allows potential buyers to search/browse through the peer-to-peer fulfillment system, and buy products displayed in the peer-to-peer marketplace system. The peer-to-peer fulfillment system described herein may be integral with such a peer-to-peer marketplace system. In another embodiment, the peer-to-peer fulfillment system provides APIs for third-party marketplace systems to directly call for and/or schedule autonomous fulfillment of peer-to-peer exchanges.

As described above herein, the peer-to-peer fulfillment system can provide an option to a seller to store their content at a warehouse. The peer-to-peer fulfillment system can optimize which warehouse should store the content based on, for example, proximity to the seller, proximity to potential buyers, warehouse capacity, and/or other factors. The peer-to-peer fulfillment system then dispatches a robot vehicle 101 to pick up content from the seller, and goes to the chosen warehouse, as described in connection with FIG. 14 and FIG. 16. The peer-to-peer fulfillment system can assign the content to a specific area of the warehouse storage space, and can record where the content is stored within the warehouse. When a potential buyer requests the item, the peer-to-peer fulfillment system can notify a human operator or a robotic system to pick up content from the storage space and deliver it into an autonomous robot vehicle 101. The peer-to-peer fulfillment system may charge the seller a certain fee or a percentage of the selling price for storing the content in the warehouse.

In an embodiment, a teleoperator may monitor the fulfillment transactions via a video camera. If the buyer or seller notifies the robot vehicle 101 that there is a problem, such as opening the secure compartment, the robot vehicle 101 may transmit the video and audio through the system to a teleoperator. The teleoperator can assist the buyer or seller, for example, by remotely verifying their information regarding the transaction and remotely assisting the buyer or seller. For example, the teleoperator could unlock the secure compartment remotely after a buyer verifies their identification through a PIN number, biometric data, or facial recognition.

Securable Compartments

Figure 2:
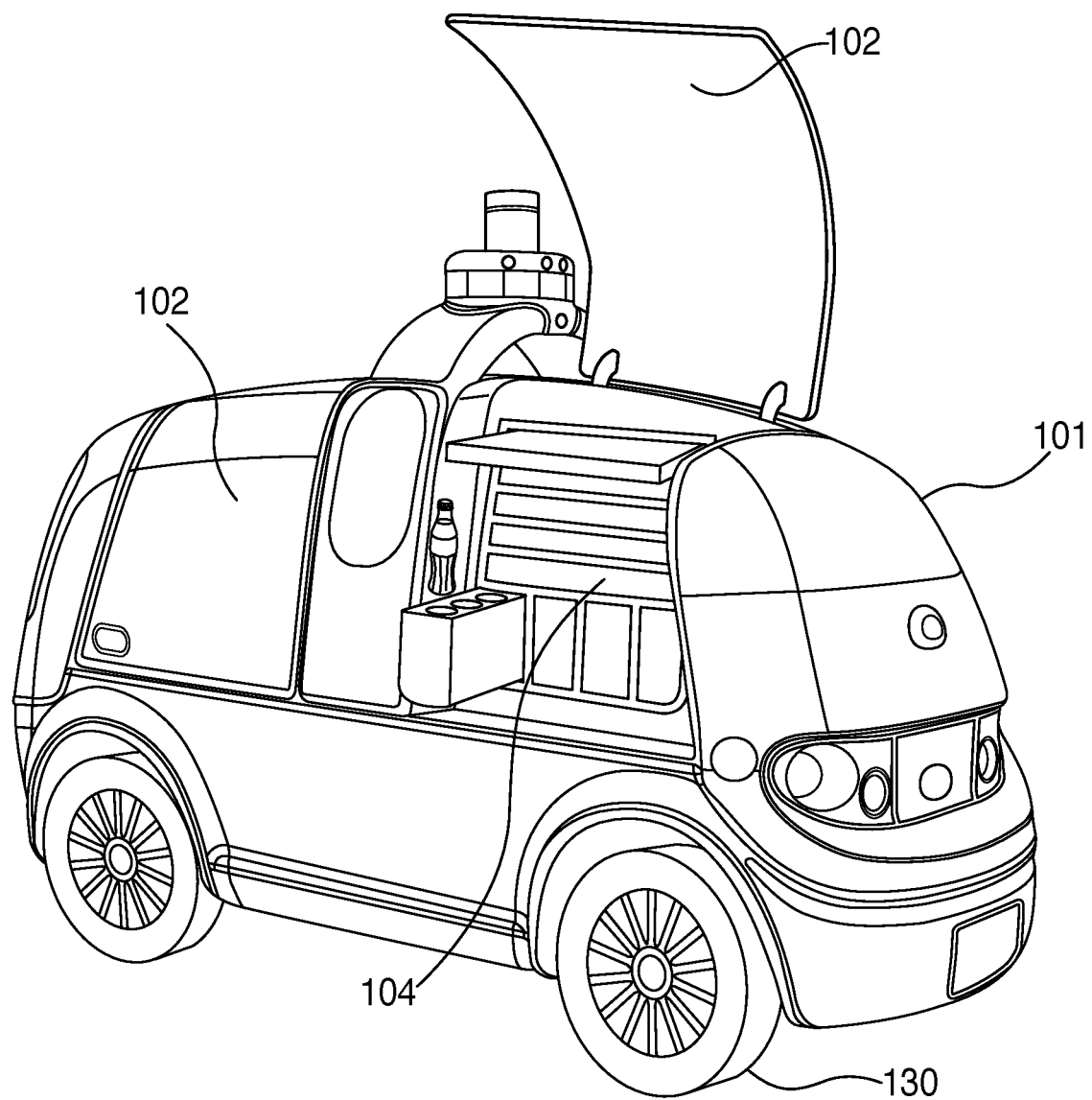
FIG. 2 is an exemplary ISO view of a robot vehicle, part of an autonomous robot fleet, illustrating securable compartments within the vehicle.
Figure 3:
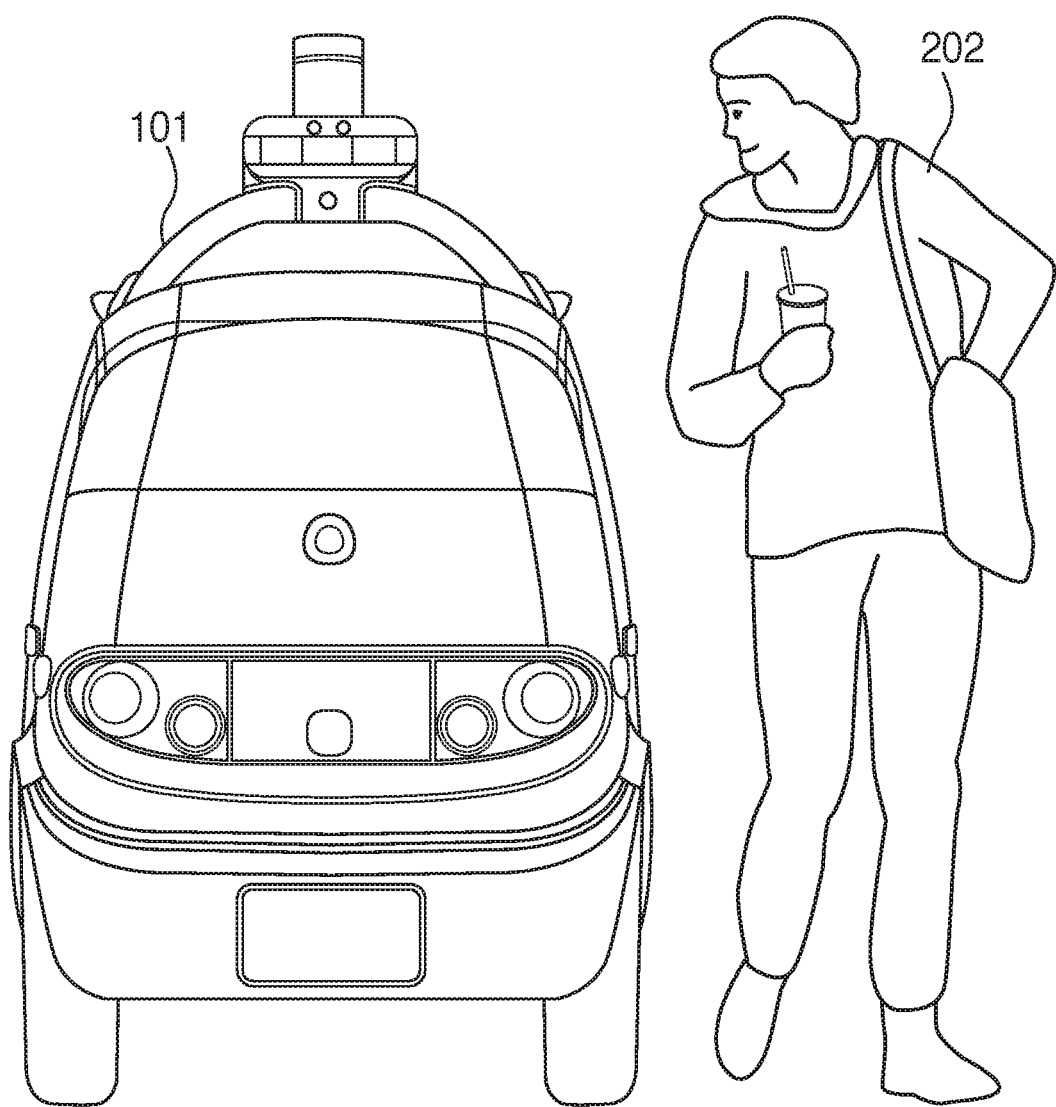
FIG. 3 is an exemplary front view of a robot vehicle, part of an autonomous robot fleet, shown in comparison to the height of an average person.
Figure 4:
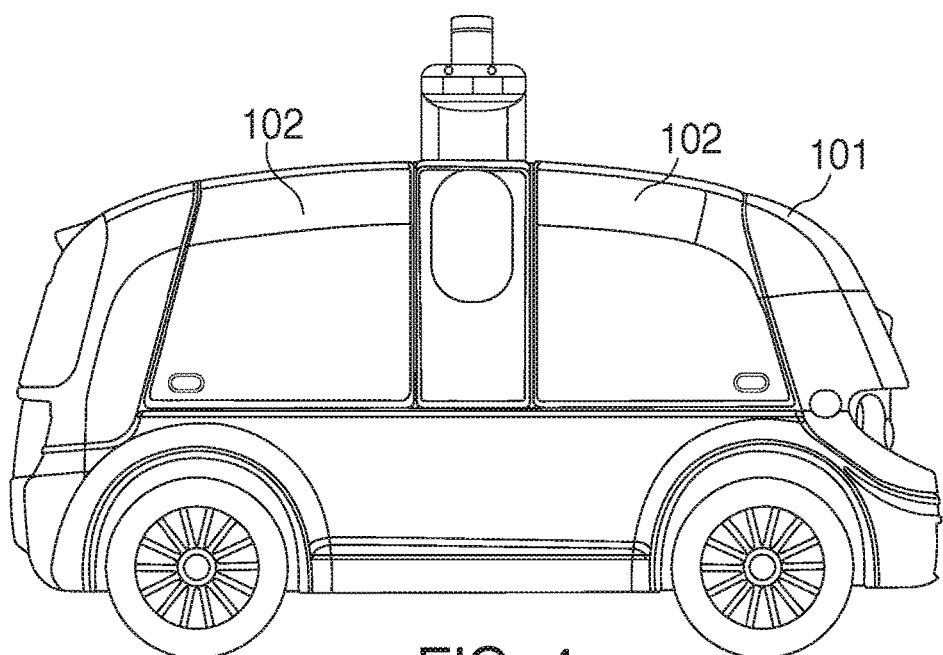
FIG. 4 is an exemplary right side view of a robot vehicle, part of an autonomous robot fleet, illustrating a configuration with two large side doors, each enclosing securable compartments.
Figure 5:
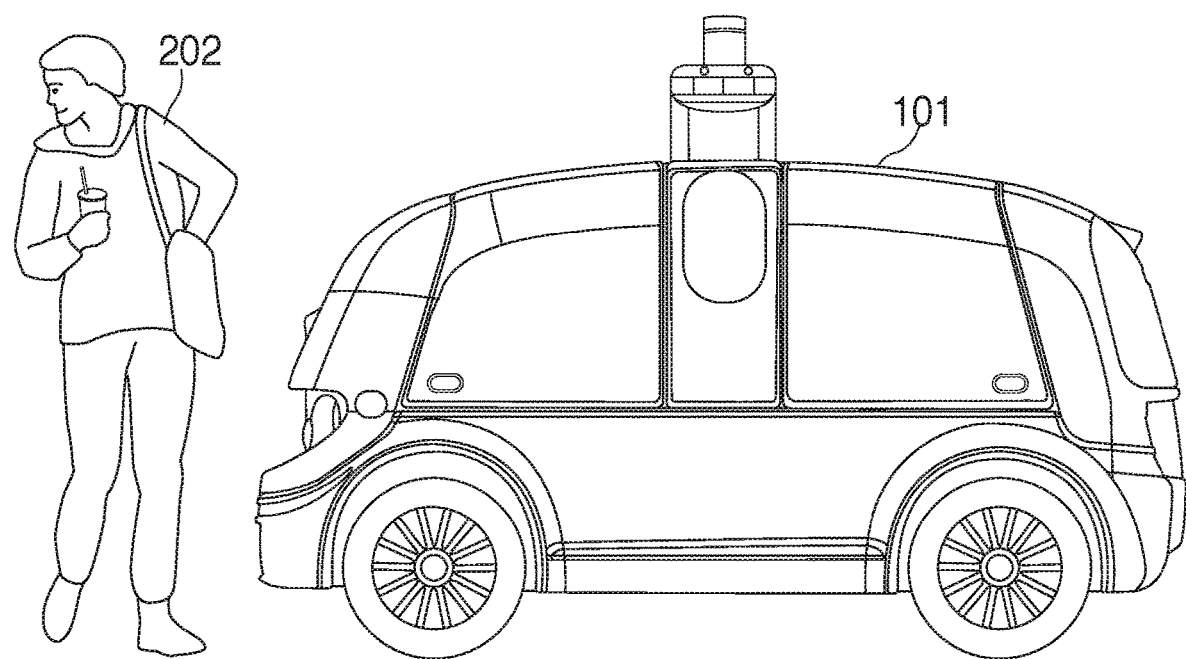
FIG. 5 is an exemplary left side view of a robot vehicle, part of an autonomous robot fleet, shown in comparison to the height of an average person.
Figure 6:
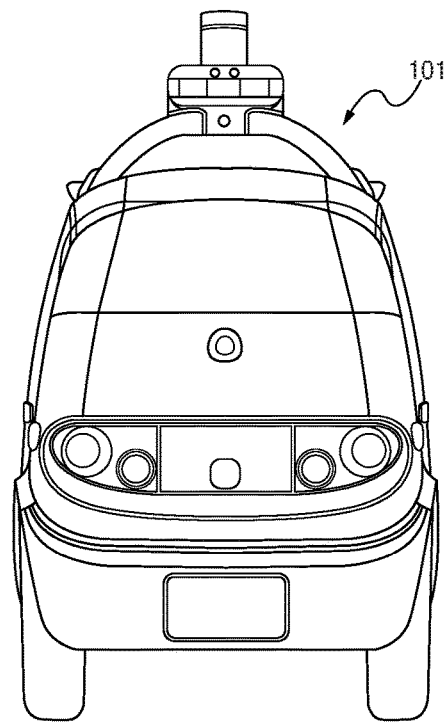
FIG. 6 is an exemplary rear view of a robot vehicle, part of an autonomous robot fleet.
Figure 7:
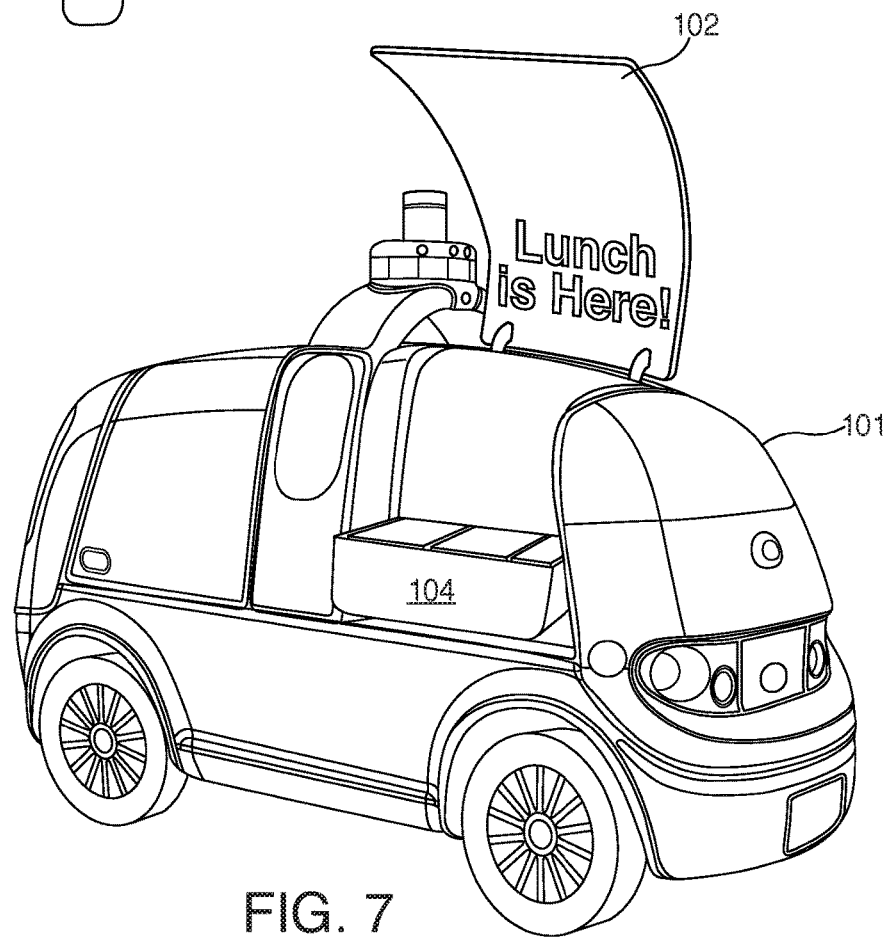
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving the item or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

The term compartment 102 is generally used to indicate an internal bay of a robot vehicle 101 that has a dedicated door at the exterior of the vehicle for accessing the bay, and also indicated an insert secured within the bay. The term sub-compartment is generally used to indicate a subdivision or portion of a compartment. One access door can open to access multiple spaces or sub-compartments 104 within one compartment 102. In accordance with the present disclosure, depictions below describe compartments and any such description applies equally to sub-compartments.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers. The compartments can be securable compartments capable of being locked and unlocked by a user, a teleoperator, a remote controller, or a combination thereof.

Figure 8:
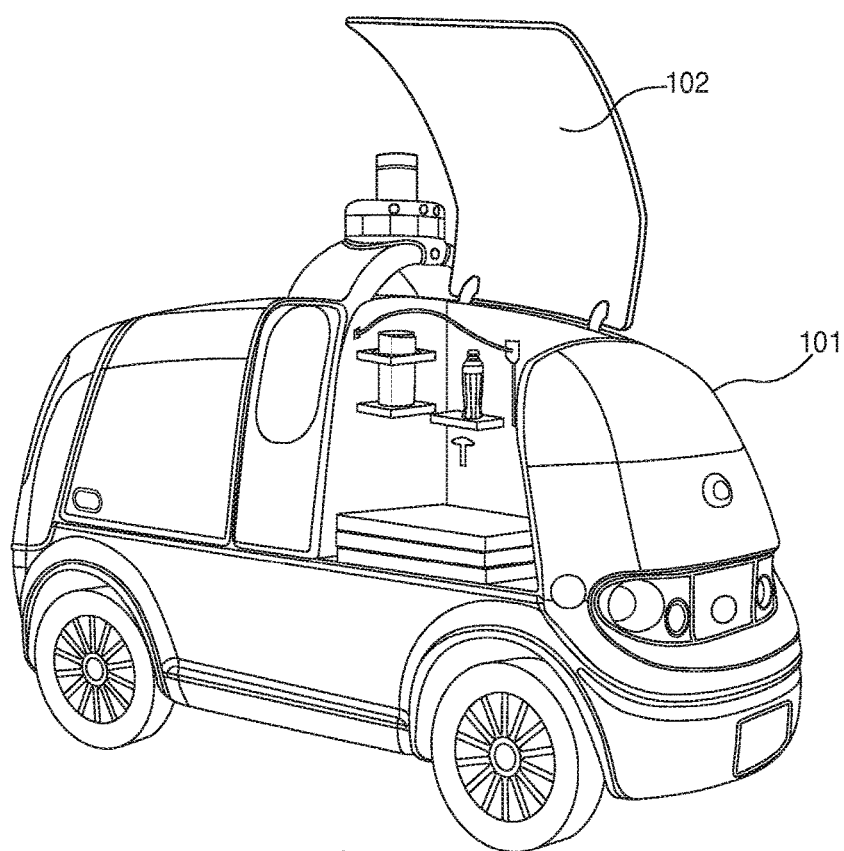
FIG. 8 is an exemplary ISO view of a robot vehicle, part of an autonomous robot fleet, illustrating an autonomous pizza delivery vehicle for any branded company.
Figure 9:
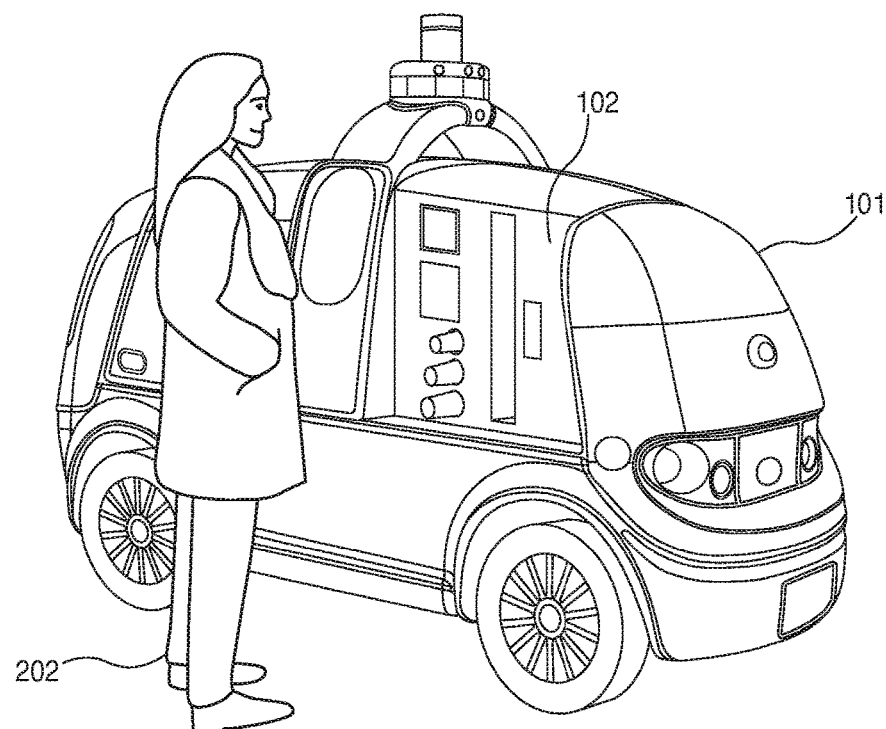
FIG. 9 is an exemplary ISO view of a robot vehicle, part of an autonomous robot fleet, illustrating an autonomous coffee delivery vehicle for any branded company.
Figure 10:
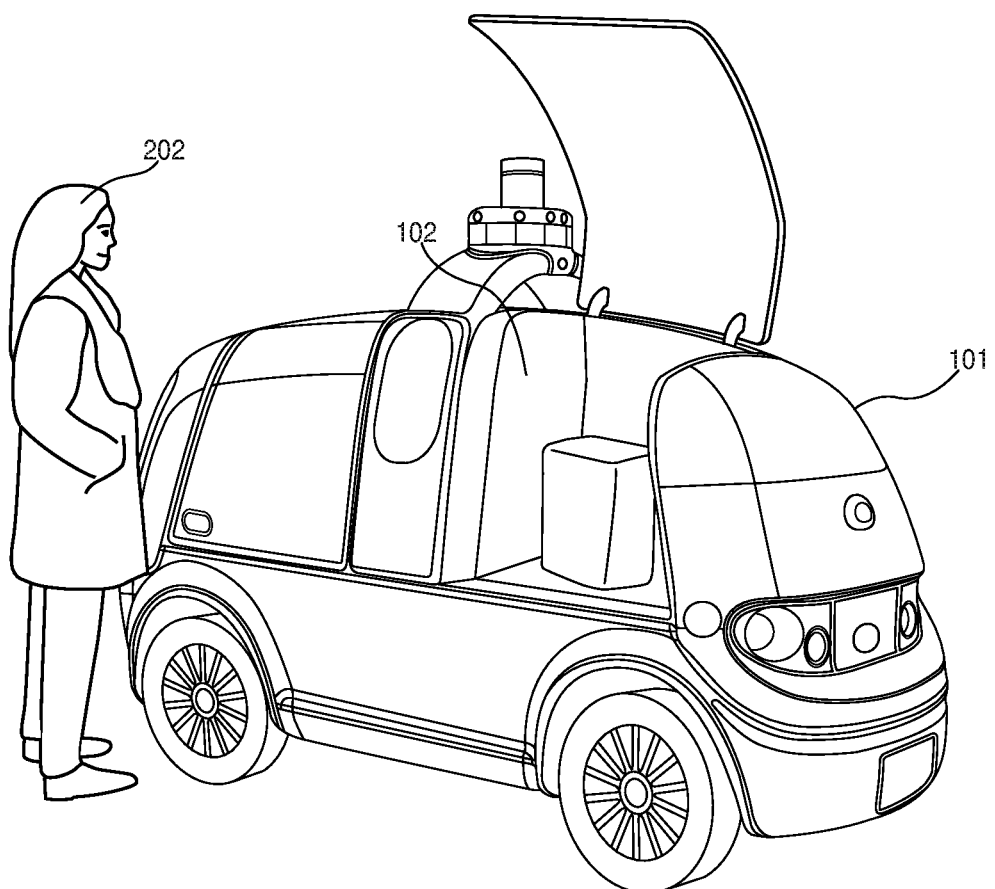
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various items. Such configurations and items include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized. Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customer can be given a PIN (e.g., 4 digit number) when he makes an initial request/order. The customer can then enter his PIN at the robot using the touchscreen or a keypad.
 2. The customer can verify or authenticate himself using a mobile phone and an RFID reader on the robot.
 3. The customer can verify himself using his voice and a personal keyword or key phrase spoken to the robot.
 4. The customer can verify himself through his face, a government ID, or a business ID badge using cameras and facial recognition, or magnetic stripe or other types of readers on the robot.
 5. The customer can verify himself using his mobile phone; by pushing a button or predetermined code on their phone (and the system could optionally detect the customer is near the robot by using their GPS position from phone)

In various embodiments, the packaging container 420 can be located in a compartment of the robot vehicle that a user can access with a PIN or in another way, as described above herein.

In accordance with the present disclosure, depictions above describe compartments and any such description applies equally to sub-compartments.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for fulfilling peer-to-peer transactions by autonomous robot vehicles without revealing identities, the system comprising:
    a fleet of autonomous robot vehicles, each autonomous robot vehicle in the fleet of autonomous robot vehicles including a camera; and
    a fleet management module including one or more processors and at least one memory storing instructions which, when executed by the one or more processors, cause the fleet management module to:
        receive information from a peer-to-peer marketplace on a peer-to-peer transaction between a seller and a buyer for a seller item, the information including a description of the seller item, wherein the peer-to-peer transaction does not reveal seller identity information to the buyer, or buyer identity information to the seller;
        verify the seller and the buyer without exposing the seller identity information to the buyer, or the buyer identity information to the seller;
        communicate instructions wirelessly to an autonomous robot vehicle of the fleet of autonomous robot vehicles to travel to a first destination and receive the seller item;
        receive an indication from the autonomous robot vehicle that the seller item has been received and that the seller item is correct in comparison to the description of the seller item, wherein interactions with the seller do not reveal the buyer identity information to the seller;
        communicate instructions wirelessly to the autonomous robot vehicle to travel to a second destination to deliver the seller item to the buyer;
        receive a signal indicating that buyer funds are in escrow;
        receive from the autonomous robot vehicle a signal indicating one of: the seller item is accepted by the buyer or the seller item is rejected by the buyer, wherein interactions with the buyer do not reveal the seller identity information to the buyer;
        in case the seller item is accepted by the buyer, communicate wirelessly a release of the buyer funds from the escrow to the seller; and
        in case the seller item is rejected by the buyer:
            receive an indication that the autonomous robot vehicle has received a real-time seller confirmation indicating whether an item placed back in at least one securable module of the autonomous robot vehicle is the seller item based on a live video of the item;
            in case the item is not the seller item, withhold the buyer funds in the escrow; and
            in case the item is the seller item:
                determine a handling itinerary for the seller item;
                communicate instructions wirelessly to the autonomous robot vehicle to store the seller item while fulfilling one or more other peer-to-peer transactions; and
                while the seller item is stored in the autonomous robot vehicle, communicate instructions wirelessly to the autonomous robot vehicle to travel to a location of a new buyer for the seller item.

2. The system of claim 1, wherein the instructions, when executed by the one or more processors, further cause the fleet management module to, in case the seller item is accepted by the buyer, receive, from the autonomous robot vehicle, a video recording an acceptance of the seller item by the buyer.

3. The system of claim 2, wherein the instructions, when executed by the one or more processors, further cause the fleet management module to store the video recording the acceptance of the seller item by the buyer in the at least one memory.

4. The system of claim 1, wherein the handling itinerary includes instructions to the autonomous robot vehicle to travel to the first destination to return the seller item to the seller.

5. The system of claim 1, wherein the system is configured for wireless communication with a device of the buyer.

6. The system of claim 1, wherein the at least one securable module is configured to unlock based on biometric data corresponding to the buyer and based on the signal indicating that the buyer funds are in the escrow.

7. The system of claim 1, wherein the autonomous robot vehicle is configured to:
 determine a first weight of the seller item; and
 in the case the seller item is rejected by the buyer:
  determine a second weight of the item; and
  compare the first weight and the second weight to determine whether the item is the seller item.

8. The system of claim 1, wherein the autonomous robot vehicle is configured to:
 capture a first image of the seller item; and
 in the case the seller item is rejected by the buyer:
  capture a second image of the item; and
  compare the first image and the second image to determine whether the item is the seller item.

9. The system of claim 1, wherein the autonomous robot vehicle is configured to:
 in the case the seller item is rejected by the buyer:
  capture the live video of the item;
  stream the live video for viewing by the seller; and
  receive the real-time seller confirmation indicating whether the item is the seller item.

10. A method for fulfilling peer-to-peer transactions by a fleet of autonomous robot vehicles, each autonomous robot vehicle in the fleet of autonomous robot vehicles including a camera, the method comprising:
 receiving information from a peer-to-peer marketplace on a peer-to-peer transaction between a seller and a buyer for a seller item, the information including a description of the seller item, wherein the peer-to-peer transaction does not reveal seller identity information to the buyer, or buyer identity information to the seller;
 verifying the seller and the buyer by a peer-to-peer fulfillment system without exposing the seller identity information to the buyer, or the buyer identity information to the seller;
 communicating instructions wirelessly to an autonomous robot vehicle of the fleet of autonomous robot vehicles to travel to a first destination and receive the seller item;
 receiving an indication from the autonomous robot vehicle that the seller item has been received and that the seller item is correct in comparison to the description of the seller item, wherein interactions with the seller do not reveal the buyer identity information to the seller;
 communicating instructions wirelessly to the autonomous robot vehicle to travel to a second destination and deliver the seller item to the buyer;
 receiving a signal indicating that buyer funds are in escrow;
 receiving from the autonomous robot vehicle a signal indicating the seller item is rejected by the buyer, wherein interactions with the buyer do not reveal the seller identity information to the buyer;
 receiving an indication that the autonomous robot vehicle has received a real-time seller confirmation indicating that an item placed back in at least one securable module of the autonomous robot vehicle is the seller item based on a live video of the item;
 determining a handling itinerary for the seller item;
 communicating instructions wirelessly to the autonomous robot vehicle to store the seller item while fulfilling one or more other peer-to-peer transactions; and
 while the seller item is stored in the autonomous robot vehicle, communicating instructions wirelessly to the autonomous robot vehicle to travel to a location of a new buyer for the seller item.

11. The method of claim 10, wherein the handling itinerary includes instructions to the autonomous robot vehicle to travel to the first destination to return the seller item to the seller.

12. The method of claim 10, further comprising unlocking the at least one securable module based on biometric data corresponding to the buyer and based on the signal indicating that the buyer funds are in the escrow.

13. The method of claim 10, further comprising:
 determining a first weight of the seller item;
 determining a second weight of the item; and
 comparing the first weight and the second weight to determine whether the item is the seller item.

14. The method of claim 10, further comprising:
 capturing a first image of the seller item;
 capturing a second image of the item; and
 comparing the first image and the second image to determine whether the item is the seller item.

15. The method of claim 10, further comprising:
 capturing the live video of the item;
 streaming the live video for viewing by the seller; and
 receiving the real-time seller confirmation indicating whether the item is the seller item.

16. An apparatus for fulfilling peer-to-peer transactions without revealing identities by a fleet of autonomous robot vehicles, each autonomous robot vehicle in the fleet of autonomous robot vehicles including a camera, the apparatus comprising:
 one or more processors; and
 at least one memory storing instructions which, when executed by the one or more processors, cause the one or more processors to:
  receive information from a peer-to-peer marketplace on a peer-to-peer transaction between a seller and a buyer for a seller item, the information including a description of the seller item, wherein the peer-to-peer transaction does not reveal seller identity information to the buyer, or buyer identity information to the seller;
  verify the seller and the buyer without exposing the seller identity information to the buyer, or the buyer identity information to the seller;
  communicate instructions wirelessly to an autonomous robot vehicle of the fleet of autonomous robot vehicles to travel to a first destination and receive the seller item;
  receive an indication from the autonomous robot vehicle that the seller item has been received and that the seller item is correct in comparison to the description of the seller item, wherein interactions with the seller do not reveal the buyer identity information to the seller;

communicate instructions wirelessly to the autonomous robot vehicle to travel to a second destination to deliver the seller item to the buyer;

receive a signal indicating that buyer funds are in escrow;

receive from the autonomous robot vehicle a signal indicating one of: the seller item is accepted by the buyer or the seller item is rejected by the buyer, wherein interactions with the buyer do not reveal the seller identity information to the buyer;

in case the seller item is accepted by the buyer, communicate wirelessly a release of the buyer funds from the escrow to the seller; and in case the seller item is rejected by the buyer:
  receive an indication that the autonomous robot vehicle has received a real-time seller confirmation indicating whether an item placed back in at least one securable module of the autonomous robot vehicle is the seller item based on a live video of the item;
  in case the item is not the seller item, withhold the buyer funds in the escrow; and
  in case the item is the seller item:
    determine a handling itinerary for the seller item;
    communicate instructions wirelessly to the autonomous robot vehicle to store the seller item while fulfilling one or more other peer-to-peer transactions; and
    while the seller item is stored in the autonomous robot vehicle, communicate instructions wirelessly to the autonomous robot vehicle to travel to a location of a new buyer for the seller item.

17. The apparatus of claim 16, wherein the instructions further cause the one or more processors to, in case the seller item is accepted by the buyer, receive, from the autonomous robot vehicle, a video recording an acceptance of the seller item by the buyer.

18. The apparatus of claim 17, wherein the instructions further cause the one or more processors to store the video recording the acceptance of the seller item by the buyer in the at least one memory.

19. The apparatus of claim 16, wherein the handling itinerary includes instructions to the autonomous robot vehicle to travel to the first destination to return the seller item to the seller.

20. The apparatus of claim 16, wherein the apparatus is configured for wireless communication with a device of the buyer.

21. The apparatus of claim 16, wherein the at least one securable module is configured to unlock based on biometric data corresponding to the buyer and based on the signal indicating that the buyer funds are in the escrow.

* * * * *